United States Patent [19]
Yonekura

[11] Patent Number: 4,964,140
[45] Date of Patent: Oct. 16, 1990

[54] DIGITAL DIFFERENTIAL SIGNAL TRANSMISSION APPARATUS

[75] Inventor: Mikio Yonekura, Hachioji, Japan

[73] Assignee: Fanuc Ltd., Minamitsuru, Japan

[21] Appl. No.: 310,719

[22] PCT Filed: Jul. 8, 1988

[86] PCT No.: PCT/JP88/00688

§ 371 Date: Feb. 7, 1989

§ 102(e) Date: Feb. 7, 1989

[87] PCT Pub. No.: WO89/00367

PCT Pub. Date: Jan. 12, 1989

[30] Foreign Application Priority Data

Jul. 8, 1987 [JP] Japan .................. 62-170355

[51] Int. Cl.$^5$ ............................................. H04B 3/00
[52] U.S. Cl. ...................................... 375/36; 361/54; 455/217
[58] Field of Search ............ 375/3, 36; 455/602; 361/56, 91, 111; 307/200.1; 361/57, 58, 54, 93; 455/117, 217

[56] References Cited

U.S. PATENT DOCUMENTS 3,587,017  6/1971  Kurusu ................... 455/217
4,023,071  5/1977  Fussel .................... 361/56
4,099,216  7/1978  Weberg ................... 361/56

Primary Examiner—Benedict V. Safourek
Assistant Examiner—Tesfaldet Bocure
Attorney, Agent, or Firm—Staas & Halsey

[57] ABSTRACT

A digital differential signal transmission apparatus is provided in a transmission line connecting a device (3) requiring an explosion-proof structure with a differential driver (101) or differential receiver (102). A shunt diode-type safety device (16) is inserted in order to realize an essential safe explosion-proof structure. High impedance transmission lines, which transmit and receive a single end signal, are employed as the transmission lines. Another shunt diode-type safety device (408) is inserted in a power supply line (143) connected to transmitting equipment (405, 406) on the side of the abovementioned device.

4 Claims, 3 Drawing Sheets

DIGITAL DIFFERENTIAL SIGNAL TRANSMISSION APPARATUS

BACKGROUND OF THE INVENTION

This invention relates to a digital differential signal transmission apparatus in which a transmission line for signals controlling a painting robot or the like is provided with an explosion-proof mechanism.

The standard RS422 of the EIA in the United States is an example of a standard used as a digital differential signal transmission method for transmitting a digital signal at high speed and over long distances.

According to this standard, first a single end input A to be transmitted is converted into a pair of differential signals, namely a signal B of the same phase and a signal C of the opposite phase, by a differential driver 11 (see FIG. 3) provided on the transmitting end. A device such as an AM26LS31 is used as the differential driver 11. The pair of differential signals is sent to a differential receiver 15, which comprises an AM26LS32 on the receiving end, by a transmission line 12, and is thereby converted into a single end output D and transmitted.

In this case, the transmission line 12 employs a line having a characteristic impedance of 100 ohms. Therefore, a filter circuit 14 comprising a resistor 13 of 100 ohms for impedance matching, a resistor 14a for improving the noise margin, and a capacitor 14b is inserted in the transmission line 12.

In an apparatus such as a painting robot used in a atmosphere containing gas that poses the danger of explosion, an explosion-proof structure is required in order to prevent the explosive gas from being ignited by a spark produced in an electric circuit.

Though there are a variety of such explosion-proof structures available, the teach pendant of a painting robot often requires what is referred to as an essential safe explosion-proof structure because of its application. An essential safe explosion-proof structure is one in which it has been verified, as by tests in public facilities, that an explosive gas will not be ignited by electric sparks produced at the time of an accident or by high-temperature parts during normal operation. At the time of abnormal operation, essential safety is assured by inserting a barrier in a signal transmission line so as to prevent the transmission of ignition energy which can lead to an explosion. The barrier referred to here is a so-called "safety device" which, as shown in FIG. 4 in the form of a shunt diode-type safety device (a Zener barrier) 16, by way of example, can be composed of voltage-limiting Zener diodes 17, a current-limiting resistor 18 and a fuse 19 for protecting the Zener diodes 17.

When a signal transmission line is inserted between a nonessential safety side in the right-hand direction of FIG. 4 and an essential safety side in the left-hand direction, energy above the limit set by the Zener barrier is not transmitted to the essential safety side and safety is assured.

FIG. 5 is a circuit diagram in which an essential safe explosion-proof structure is obtained by inserting a Zener barrier in the above-described digital differential signal transmission system.

In FIG. 5, the Zener barrier 16 described in conjunction with FIG. 4 is inserted into each of a pair of transmission lines 20 provided between the differential driver 11 and the differential receiver 15, thereby maintaining safety on the side of the differential receiver 15.

However, since the transmission lines 20 have a characteristic impedance of 100 ohms, the voltage-dropping effect of the current-limiting resistor 18 of Zener barrier 16 is great and the signal level becomes small on the receiving end. A problem that results is a reduced noise margin.

Further, since the Zener barriers 16 are inserted in the transmission lines 20 at points along their lengths, mismatching develops in the characteristic impedances of the transmission lines, reflection of transmitted signals occurs and distortion is produced in the signal waveforms.

Moreover, there is a need to provide two Zener barriers in the transmission lines in one direction, as shown in FIG. 5. In two-way communications for transmitting and receiving signals, 2×2 Zener barriers, for a total of four, are required, as shown in FIG. 6. Use of four Zener barriers, which are comparatively high in price, raises the cost of the transmission lines.

SUMMARY OF THE INVENTION

The present invention has been devised in order to solve these problems and its object is to provide a digital differential signal transmission apparatus in which a decline in noise margin and the occurrence of transmitted waveform distortion in a transmission line using an explosion-proof structure are suppressed, and in which installation costs can be reduced.

According to the invention, there is provided a digital differential signal transmission apparatus provided in a transmission line for transmitting a differential signal to and receiving a differential signal from a device requiring an explosion-proof structure. A shunt diode-type safety device is inserted to afford the transmission line with an essential safe explosion-proof structure. The apparatus comprises a receiver for receiving the digital differential signal and converting it into a single end input, a driver for re-converting the single end input into a differential signal and outputting the signal, a high-input impedance receiver inserted between the receiver and the driver in series with the shunt diode-type safety device, and a shunt diode-type safety device inserted in a power supply line to a transmitting means of the device, which is on the side of the receiver or driver, requiring the explosion-proof structure.

Accordingly, the digital differential signal transmission apparatus of the invention is such that a high-input impedance transmission line for a single end signal is employed as a signal transceiving/receiving transmission line, and a shunt diode-type safety device is inserted. This makes it possible to eliminate the drawbacks of a decline in noise margin and impedance mismatching. In addition, two shunt diode-type safety devices are required, and even if one is added for use in the power supply line to the transmission equipment, the total number of the devices is three. Thus, the number of these devices required is reduced over the prior art.

DESCRIPTION OF THE PREFERRED EMBODIMENT

An embodiment of the present invention will now be described in detail with reference to the drawings.

Figure 1:
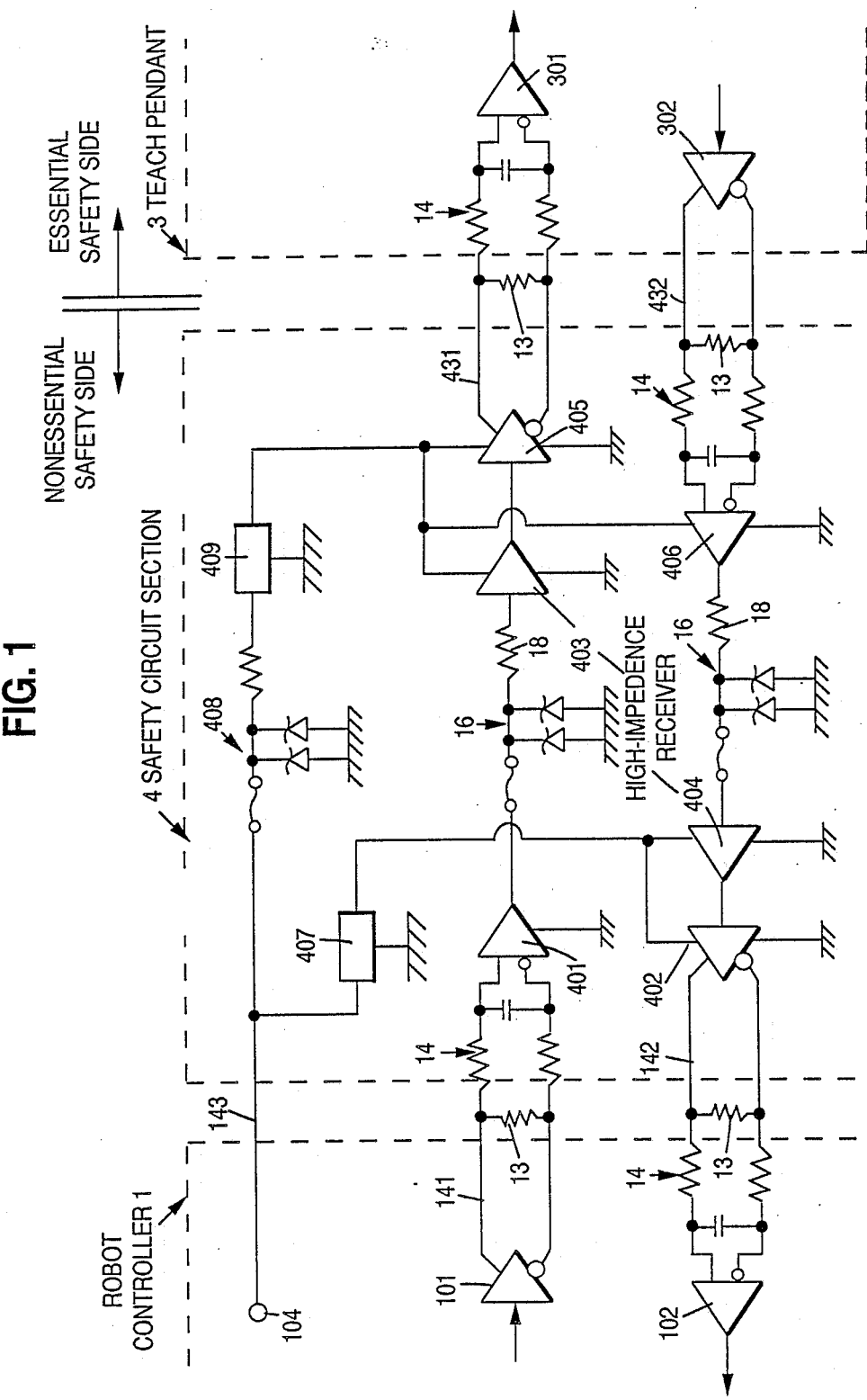
FIG. 1 is a block circuit diagram illustrating an embodiment according to the present invention.
Figure 2:
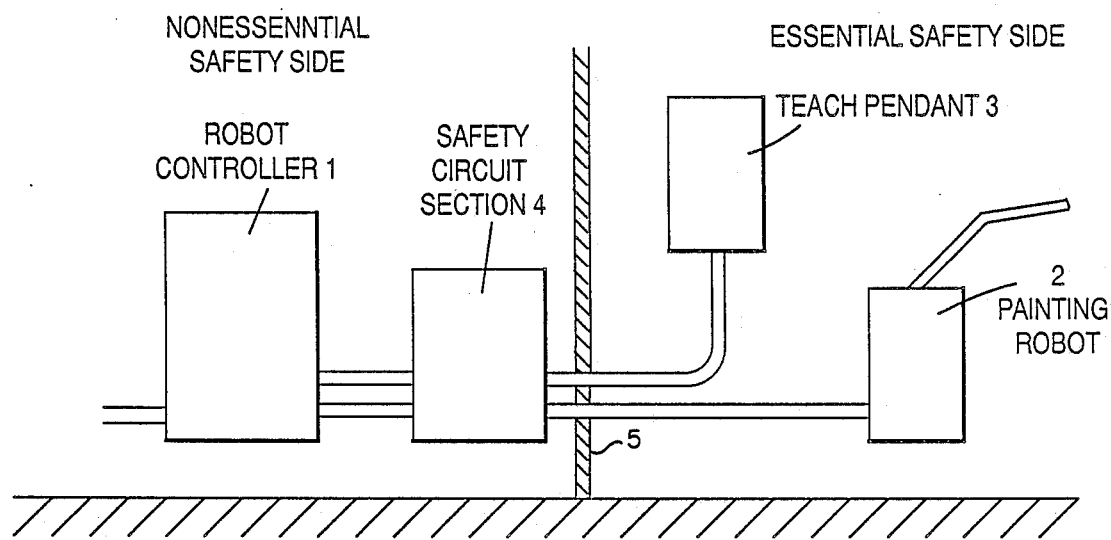
FIG. 2 is a block diagram for describing a robot control mechanism to which the invention in FIG. 1 is applied.

FIG. 1 is a block circuit diagram of an embodiment according to the present invention, and FIG. 2 is a block diagram for describing a robot control mechanism to which the invention is applied.

In FIG. 2, numeral 1 denotes a robot controller forming the control section of a painting robot 2. A teach pendant 3 is connected to the control section 1 by a control signal transmission line via the intermediary of a safety circuit section 4.

The teach pendant 3 has a microprocessor, a keyboard, a display unit and the like and is operated at a painting site in order that an operator may teach a robot a task. When the operator is manipulating the teach pendant, residual ignitable gases are present even if the painting site is ventilated. As a result, an explosion-proof structure is required. A partition 5 is provided between the painting site and the general work area to form a boundary between the painting site, which is the essential safety side, and the general work area, which is the nonessential safety side.

Figure 3:
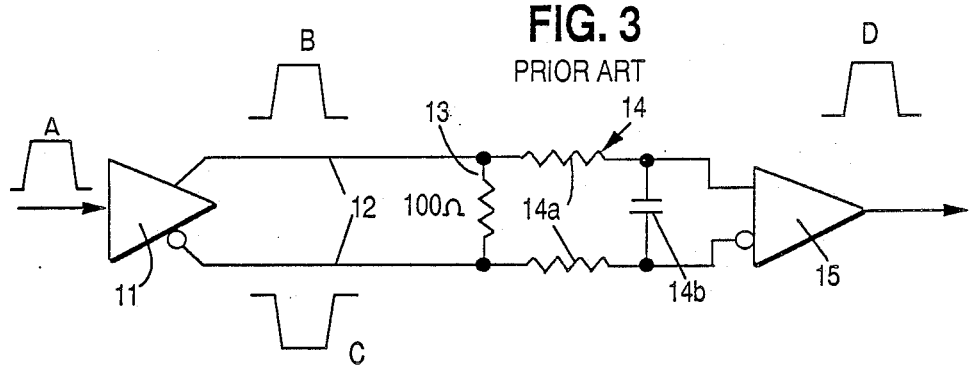
FIG. 3 is a circuit diagram of one example of a digital differential signal transmission system.

In FIG. 1, the robot controller 1 is provided with a differential driver 101 and a differential receiver 102 for sending signals to and receiving signals from the safety circuit section 4. The drivers 101 and 102 are connected to a corresponding differential receiver 401 and differential driver 402, which are provided in the safety circuit section 4, by respective transmission lines 141 and 142 each having a characteristic impedance of 100 ohms. A transmitting end 104 of a power supply line, described below, is also provided on the side of the robot controller 1. Further, the input sides of the differential receivers 102 and 401 are respectively provided with an impedance matching resistor 13 and filter 14, described above in conjunction with FIG. 3.

Figure 4:
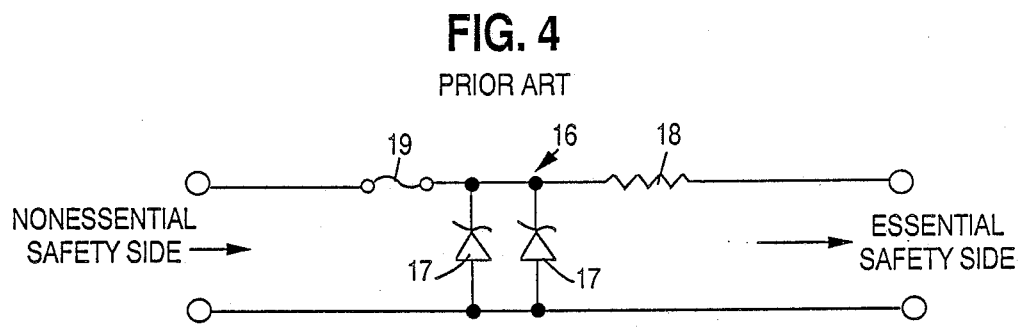
FIG. 4 is a circuit diagram of a prior art shunt diode-type safety device.
Figure 5:
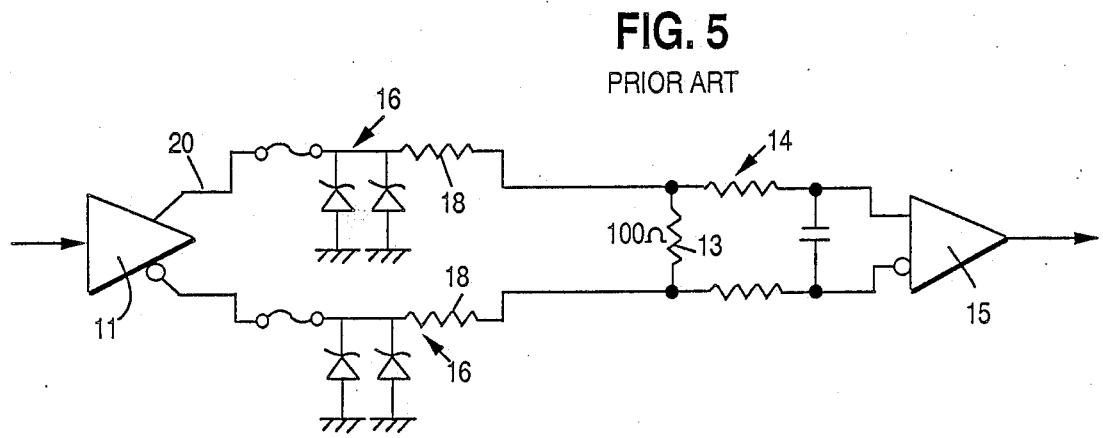
FIGS. 5 and 6 are circuit diagrams of prior art shunt diode-type safety devices inserted in a digital differential signal circuit.
Figure 6:
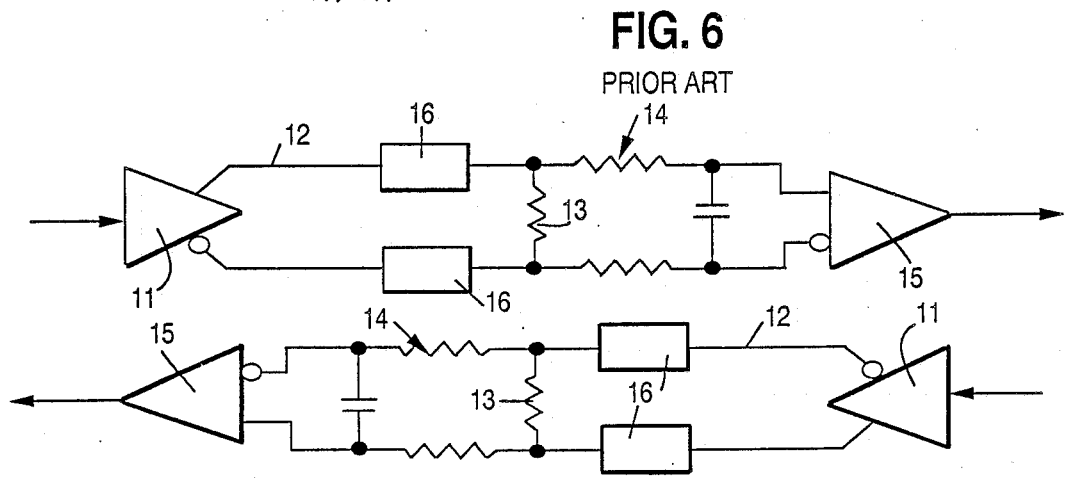

A high-input impedance receiver 403 is connected to the single end output of the differential receiver 401 via the Zener barrier 16 described in conjunction with FIG. 4, and the output of the receiver 403 is connected to a differential driver 405. The connections are such that the signals converted into a pair of differential signals by the differential driver 405 are transmitted to a differential receiver 301 having the resistor 13 and filter 14, which are provided in the teach pendant 3, via a transmission line 431 having a characteristic impedance of 100 ohms.

Next, the connections are such that the single end transmission signal from the teach pendant 3 is transmitted from a differential converter 302, which converts the signal into a pair of differential signals, to a differential driver 406 having the resistor 13 and filter circuit 14 via a transmission line 432 whose characteristic impedance is 100 ohms. An output obtained by being converted into a single end signal by the differential driver 406 is connected so as to be input to a high-input impedance receiver 404 via the Zener barrier 16. The output from the high-input receiver 404 is converted into a pair of differential signals by the differential driver 402. These signals are connected so as to be transmitted to the differential receiver 102, which has the resistor 13 and filter circuit 14, via the transmission line 142 having a characteristic impedance of is 100 ohms. These signals are transmitted to the robot controller 1 as a single end signal.

Numeral 143 denotes a power supply line for supplying power to various transmission equipment provided in the safety circuit section 4. The differential receiver 401, differential driver 402 and high-input impedance receiver 404 are supplied with predetermined voltages via a regulator 407. The power supplied to the high-input impedance receiver 403, differential driver 405 and differential receiver 406 from the power supply line 143 is controlled to predetermined voltages by a regulator 409 via a Zener barrier 408 which assures essential safety, after which the voltages are supplied to the respective units. It should be noted that the portion passing through the partition 5 shown in FIG. 2 includes the transmission lines 431 and 432. The safety circuit portion 4 itself is disposed outside the painting site, as shown in FIG. 2.

In accordance with the embodiment thus constructed, the Zener barriers 16 are inserted in the signal transmission lines between the output of differential receiver 401 and high-input impedance receiver 403 and between the output of the differential receiver 406 and the high-input impedance receiver 404. Energy above the boundary limited by the Zener barriers 16 is not transmitted from the side of the robot controller to the side of the teach pendant 3.

Further, the high-input impedance receiver 403 or 404 is connected as a receiver to the circuit in which the Zener barrier 16 is inserted. Since the input impedance is high, the influence of the signal voltage drop due to the resistor 18 possessed by the Zener barrier 16 is mitigated.

With regard to the power supply line 143, the Zener barrier 408 is provided in the line which supplies power to the high-input impedance receiver 403, differential driver 405 and differential receiver 406. Energy exceeding the boundary limited by the Zener barrier 408 is not transmitted to the side of the teach pendant 3.

Though an embodiment of the present invention has been described, the invention is not limited thereto and can be modified in a variety of ways without departing from the scope of the claims.

In the digital differential signal transmission apparatus of the present invention, a transmission line for sending and receiving a single end signal is interposed in the transmission line connecting the teach pendant, which requires an explosion-proof structure, and the robot controller. A Zener barrier is inserted in this transmission line. The output is received by the receiver having the high-input impedance, and a Zener barrier is also inserted in the power supply line of the transmission equipment leading to the teach pendant. Accordingly, a decline in noise margin due to insertion of the internal resistance of the Zener barrier can be eliminated and the problem of waveform distortion due to impedance mismatching is solved. Furthermore, since only three of the Zener barriers for assuring essential safety suffice, the cost of the digital differential signal transmission apparatus can be reduced.

I claim:

1. A digital differential signal transmission apparatus provided in a transmission line for transmitting a differential signal to and receiving a differential signal from a device requiring an explosion-proof structure, a shunt diode-type safety device being inserted to provide the transmission line with an essential safe explosion-proof structure, the apparatus comprising:
  a receiver, operatively connected to receive the digital differential signal, for converting the digital differential signal into a single end input;
  a driver for re-converting said single end input into a differential signal and outputting a signal;
  high-input impedance receiver, operatively connected between said receiver and said driver; and
  shunt diode-type safety devices, inserted in a power supply line and operatively connected in series with said high-input impedance receiver, having an explosion-proof structure.

2. A digital differential signal transmission apparatus according to claim 1, wherein said shunt diode-type safety device comprises:
  a voltage-limiting Zener diode;
  a current-limiting resistor connected to said Zener diode; and
  a fuse, connected to said Zener diode, for protecting said Zener diode.

3. A digital differential signal transmission apparatus according to claim 1, further comprising a regulator, inserted in the power supply line and operatively connected to said receiver and said driver, for regulating voltage to a predetermined voltage value.

4. A digital differential signal transmission apparatus according to claim 1, wherein the transmission line for transmitting and receiving the digital differential signal is a two-way transmission line having four lines, and wherein said high-input impedance receivers are inserted in series with respect to the transmission lines on the side of the device requiring said explosion-proof structure.

* * * * *